United States Patent
Verykios

(10) Patent No.: US 6,387,554 B1
(45) Date of Patent: May 14, 2002

(54) PROCESS FOR THE PRODUCTION OF HYDROGEN AND ELECTRICAL ENERGY FROM REFORMING OF BIO-ETHANOL WITH THE USE OF FUEL CELLS AND WITH ZERO EMISSION OF POLLUTANTS

(75) Inventor: Xenophon Verykios, 7, Kilkis Street, GR-26441 Patra (GR)

(73) Assignees: Xenophon Verykios, Patra; Kadmos S.A. Investment Initiatives, Maroussi, both of (GR)

(*) Notice: Subject to any disclaimer, the term of this patent is extended or adjusted under 35 U.S.C. 154(b) by 0 days.

(21) Appl. No.: 09/446,561
(22) PCT Filed: May 19, 1999
(86) PCT No.: PCT/GR99/00020
  § 371 Date: Dec. 21, 1999
  § 102(e) Date: Dec. 21, 1999
(87) PCT Pub. No.: WO99/61369
  PCT Pub. Date: Dec. 2, 1999

(30) Foreign Application Priority Data

May 22, 1998 (GR) .......................................... 980100180

(51) Int. Cl.⁷ .................................................. H01M 8/06
(52) U.S. Cl. .......................................... 429/17; 429/19
(58) Field of Search .............................. 429/17, 19, 20; 422/196, 197

(56) References Cited

U.S. PATENT DOCUMENTS

| | | | |
|---|---|---|---|
| 5,198,310 A | * 3/1993 | Fleming et al. | ................ 429/17 |
| 5,248,566 A | * 9/1993 | Kumar et al. | ................ 429/19 |
| 5,736,026 A | * 4/1998 | Patel et al. | ............... 429/17 X |
| 5,935,533 A | * 8/1999 | Kleefisch et al. | ....... 422/196 X |
| 5,942,346 A | * 8/1999 | Ahmed et al. | ................ 429/20 |
| 6,074,769 A | * 6/2000 | Johnssen | ................ 429/17 X |

FOREIGN PATENT DOCUMENTS

| JP | 59-189935 | * 10/1984 |
|---|---|---|
| JP | 63-039626 | * 2/1988 |

OTHER PUBLICATIONS

Birdsell et al. "Pure Hydrogen Production from Octane, Ethanol, Methanol, and Methane Reforming Using a Palladium Membrane Reactor", Proceedings of the 32nd Intersociety Energy Conversion Engineering Conference, pp. 1942–1946, Jul. 1997.*

(List continued on next page.)

Primary Examiner—Stephen Kalafut
(74) Attorney, Agent, or Firm—Herbert Dubno

(57) ABSTRACT

A process for the production of hydrogen and electrical energy, with zero emission of pollutants, from ethanol which is produced from biomass, which is characterized by the partial oxidation/reforming of ethanol with water for hydrogen production which is subsequently fed to a fuel cell for production of electrical energy, more specifically where an aqueous solution of ethanol originating from fermentation of biomass is separated by distillation or any other technique so as to contain approx. 40–70% by weight of ethanol, preferably 50–60%, this mixture, mixed with a suitable quantity of air in such a way so as the ratio of moles oxygen per mole ethanol to be between zero and 0,5, is fed to a reactor in which the reactions of partial oxidation and reforming of ethanol are taking place over a suitable catalyst, where in the same or a different reactor the shift reaction is taking place and, if necessary, the reaction of combustion of CO or its conversion to $CH_4$, where the gaseous mixture from the exit of the reactors which contain hydrogen in mixture with carbon dioxide, nitrogen, methane or other gases in small quantities, is separated to the extent which is desirable for any kind of application.

5 Claims, 2 Drawing Sheets

OTHER PUBLICATIONS

Kothari et al, "Economics of Biomass–Derived Alcohol Application in Fuel Cells" *Energy Progress* vol. 2, No. 4, pp. 187–191, Dec. 1982.*

Haga et al, "Effect of Particle Size on Steam Reforming of Ethanol Over Alumina–Supported Cobalt Catalyst.", Nov. 1997.*

Kumar et al. "Fuel Processing Requirements and Techniques . . . " ACS 206th National Meeting, pp. 1471–1476, 1993 (Month unknown).*

* cited by examiner

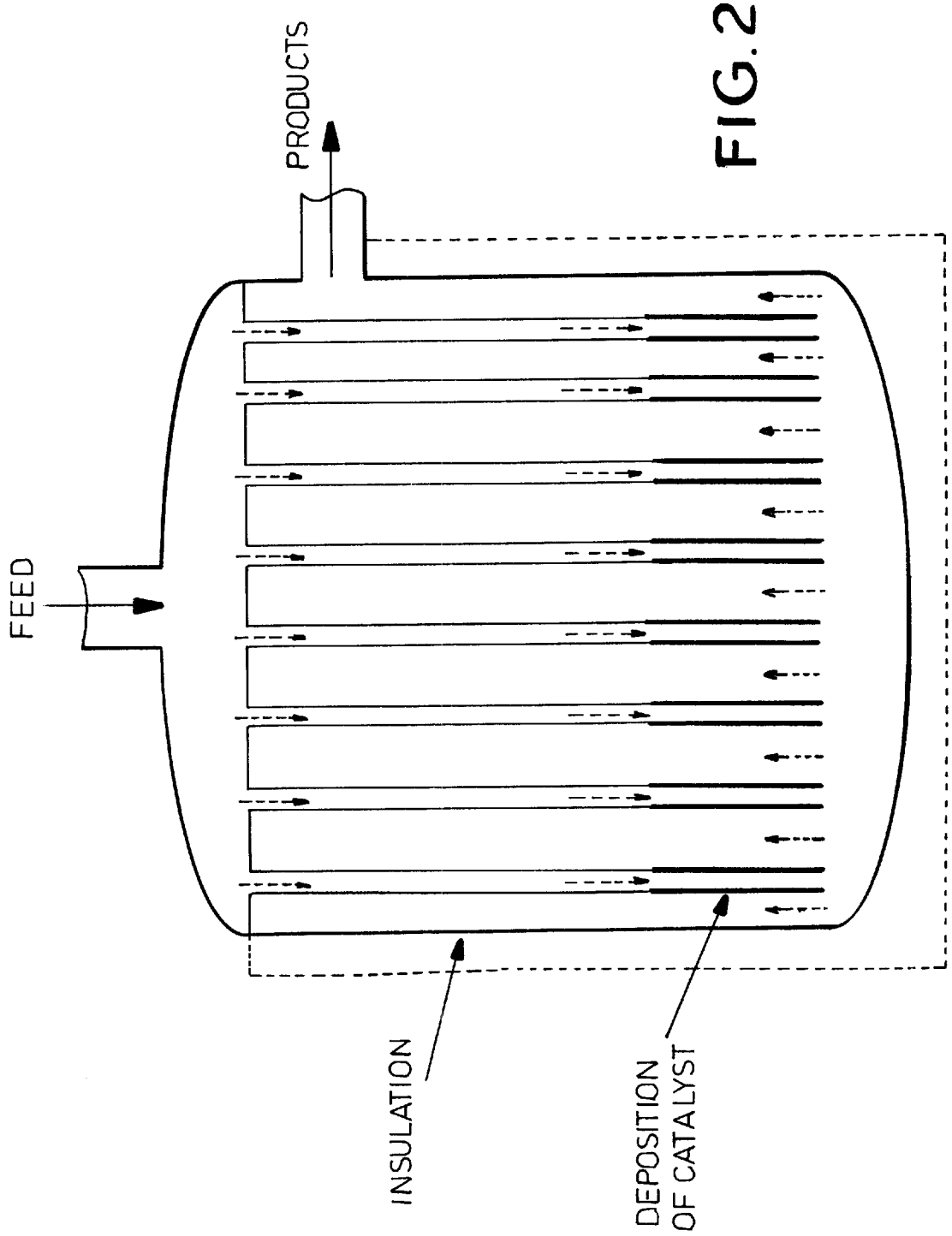

PROCESS FOR THE PRODUCTION OF HYDROGEN AND ELECTRICAL ENERGY FROM REFORMING OF BIO-ETHANOL WITH THE USE OF FUEL CELLS AND WITH ZERO EMISSION OF POLLUTANTS

CROSS REFERENCE TO RELATED APPLICATIONS

This application is a national stage of PCT/GR 99/00020 filed May 19, 1999 and based on German national application 98 0100180 of May 22, 1998 under the International Convention.

FIELD OF THE INVENTION

The present invention relates to a process for the production of hydrogen and electrical energy by the reforming of bioethanol, with the use of fuel cells and with zero emission of pollutants. Ethanol is produced from biomass which contains sugar and/or cellulosic components, originating from any source. An aqueous solution of ethanol (approximately 40–70% by weight) is mixed with air (0–0.5 mol oxygen per mol ethanol) and is fed to a reactor which contains a suitable catalyst for the reactions of partial oxidation and reforming of ethanol to take place. In the same or different reactor the shift reaction for the consumption of carbon monoxide and further production of hydrogen takes place.

The gaseous mixture which is produced in this manner is rich in hydrogen which can be separated and used in different applications. Alternatively, the gaseous mixture is fed to a fuel cell, preferably of the phosphoric acid or proton exchange membrane or solid polymer type, in which electrical energy and heat are produced.

No emissions harmful to the environment are produced in any of the stages of the above process.

BACKGROUND OF THE INVENTION

The use of biomass as a renewable energy source has been (C. E. Wyman, Handbook On Bioethanol, Taylor and Francis, 1996). Three different systems using biomass as an energy source have been applied internationally: Combustion, pyrolysis for the production of gaseous and liquid fuels, and fermentation for the production of ethanol. Sources of biomass can be plants which have certain specific characteristics and which are grown for this purpose, or waste materials from cultivation of edible products or from agroindustries or from forestry. Studies which have been conducted in recent years show that there are significant quantities and sources of biomass which can be utilized for the production of energy.

The production of ethanol from biomass which is often referred to in the literature as "bio-ethanol", is known and is practiced on a large scale, mostly in North and South America and in Europe (D. O. Hall, G. Grasi and H. Scheer, "Biomass for Energy and Industry", Proc. 7th Int. Conf. Biomass, Florence, Italy, Oct. 5–9, 1992). The processes for the production of ethanol can be classified in two large categories: Those which utilize sugar-containing raw materials—products of energetic cultivations (sorghum, cane, solid residue of sweet sorghum, etc.) as well as form residues of agroindustries. In the first case sugars are directly fermented for the production of ethanol while in the second case a hydrolysis step or another process from the production of sugars, which are then converted to ethanol via fermentation is employed (see the references previously cited).

Although the technology of biomass fermentation for the production of ethanol is mature, it has not been applied in large scale, at least in Europe, for economic reasons. A large fraction of the cost of bio-ethanol is the cost of separation of the aqueous solution which derives from fermentation and which contains approximately 8 to 12% ethanol. In order to use ethanol as a fuel in internal combustion engines the required purity exceeds 99%. Because ethanol and water form an azeotropic solution when the ethanol content is approximately 95%, further purification requires energy-consuming techniques, the application of which increases significantly the cost of bio-ethanol.

OBJECTS OF THE INVENTION

The object of the present invention is to utilize ethanol which is produced from biomass for the production of energy without requiring its separation from water to a large degree.

Another object is to provide a method of utilizing ethanol whereby the cost of ethanol production is reduced significantly while, simultaneously, the thermodynamic efficiency of its use is increased significantly (with the application of fuel cells) and the gaseous pollutants (would be produced by its burning (for example in internal combustion engines) are eliminated.

SUMMARY OF THE INVENTION

According to the present invention, a mixture of ethanol, oxygen and water react and produce hydrogen and carbon dioxide, and the hydrogen is fed to a fuel cell which produces electrical energy from the electrochemical oxidation of hydrogen to water. The reforming of ethanol with water which is described by the reaction:

$$C_2H_5OH + 3H_2O \rightarrow 2CO_2 + 6H2, \quad \Delta H = +23.7 \text{ KJ/mol} \qquad (1)$$

has been little investigated, in contrast to the reforming of methanol. It has been reported that reforming of ethanol over a copper catalyst of a Pd/ZnO produces acetic acid, acetaldehyde, $H_2$ and heavier oxygen-containing products (N. Takezawa and N. Iwasa, Catal. Today, 36 (1997) 45. Acetaldehyde is also produced when the reaction is taking place on Ni and Pt catalyst supported on MgO (M. Morita, A. Sato and Y. Matsuda, Nippon Kagaku Kaishi, (1993) 164. Complete reforming of ethanol on a Ni catalyst has been reported, which, however, deactivates rapidly, probably due to carbon deposition (D. Wang, D. Montane and E. Chornet, Appl. Catal. A, 143 (1996) 245. The reaction of reforming of ethanol with water (Reaction 1) is endothermic and consequently supply of heat to the reactor is required. The simplest way to achieve this is the co-feeding of oxygen (air) together with the ethanol-water mixture over a suitable catalyst so that a small fraction of ethanol is oxidized to $CO_2$ and $H_2O$, producing the required heat for the reforming reactions.

$$C_2H_5OH + 1/2O_2 + 2H_2O \rightarrow 5H_2 + 2CO_2, \quad \Delta H = -20 \text{ Kcal/mol} \qquad (2)$$

As far as we know, no study has appeared in the literature referring to the partial oxidation /reforming of ethanol.

According to the invention the hydrogen which is produced from the partial oxidation/reforming of ethanol., is fed to a fuel cell for the production of electrical energy. The advantages of fuel cells are the zero emission of pollutants since the only product of combustion of hydrogen is water and the improved thermodynamic efficiency in comparison with internal combustion engines.

Fuel cells are an innovation which finds applications in the production of electrical energy without the emission of pollutants, consuming hydrogen as fuel which is oxidized electrochemically with oxygen, with simultaneous production of electrical energy (R. Friberg, Int. J. Hydrogen Energy, 18 (1993) 853. The efficiency of fuel cells approaches 70% in terms of the heat which corresponds to the combustion of hydrogen, i.e. it is twice the efficiency of thermal engines which are subjected to the thermodynamic constraints of the Carnot type. There are five types of fuel cells which differ as to the type of electrolyte and in the temperature of operation. 1) The Phosphoric Acid type which is the most commercially advanced type and operate at temperatures around 200° C. They produce electrical energy with efficiency from 40 to 80% (V. Recupero, V. Alderrucci, R. Di Leonardo, Int. J. Hydrogen Energy, 19 (1994) 633. 2) Proton exchange membranes or solid polymers which operate at low temperatures, approximately 100° C., and offer large power density with quick response to power demands (T. R. Ralph, Platinum Metals Rev., 41 (1997) 102. 3) Solid Oxide fuel Cells which can be utilized in applications in which large power outputs are required and operate at about 1000° C. (Q. M. Nguyen, Chemtech, January 1992, p. 32). 4) Molten Carbonate Salts, whose electrolyte consists of molten carbonate salts of Li and K, the fuel is hydrogen and CO and the oxidizing mixture consists of oxygen and $CO_2$.

They operate at temperatures of 600° C. with a large efficiency of fuel over power production (Q. M. Nguyen, Chemtech, January 1992, p. 32). 5) Alkalines which were used in space applications and produced power with an efficiency of approximately 70% operating at temperatures 60–150° C.

BRIEF DESCRIPTION OF THE DRAWING

The above and other objects, features, and advantages will become more readily apparent from the following description, reference being made to the accompanying drawing in which:

FIG. 2: Schematic diagram of a reactor suitable for ethanol partial oxidation/reforming reactions. The reactor consists of a bundle of ceramic or metallic tubes. In the internal surface of the tubes the partial oxidation catalyst is deposited in the form of a thin film while in the external surface the reforming catalyst is deposited. The reactor gives a high thermal stability and safe operation over high temperatures.

SPECIFIC DESCRIPTION

Figure 1:
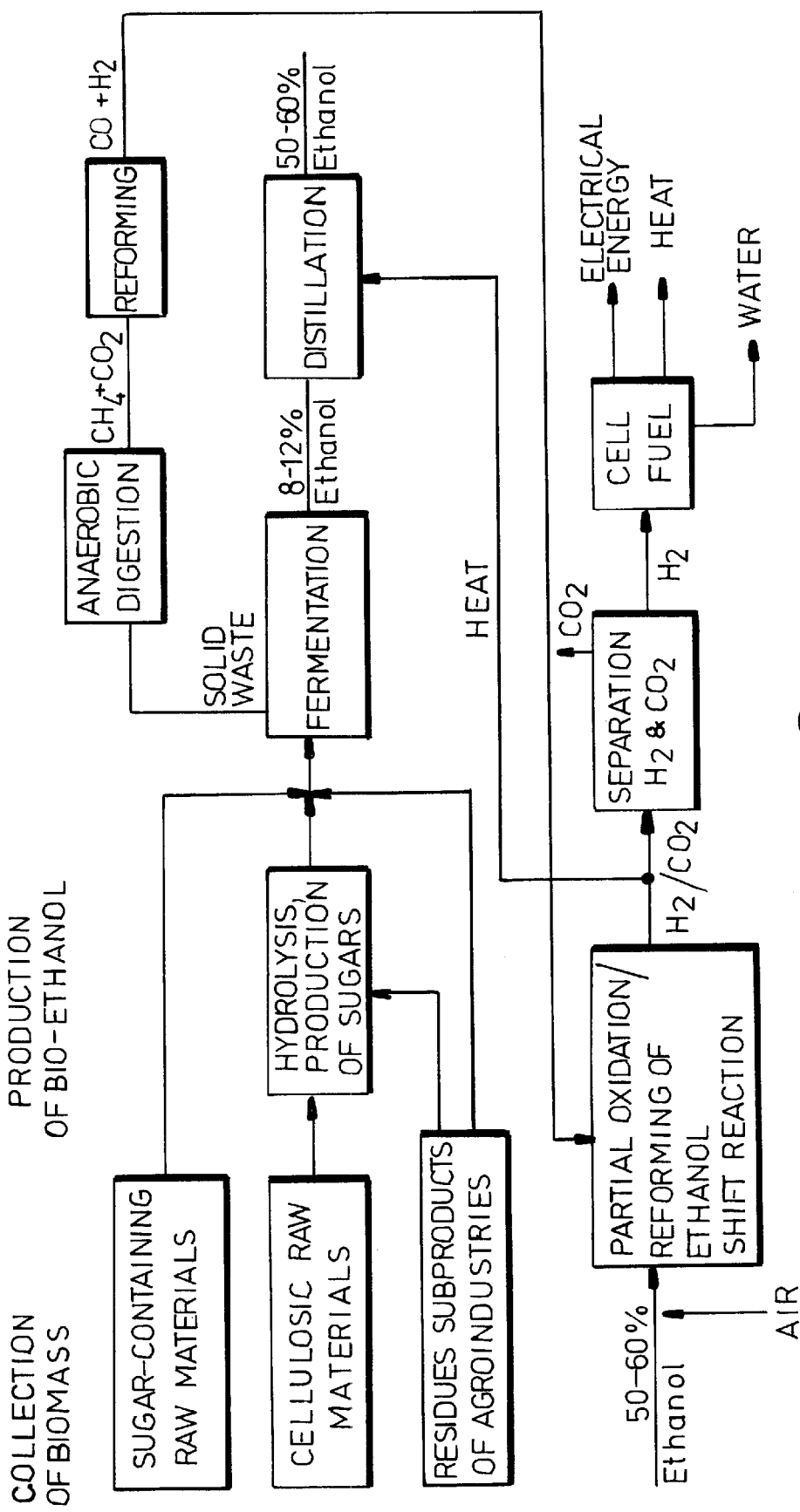
FIG. 1: Schematic diagram of the process of hydrogen and electrical energy production from biomass with a zero pollutant emission. The first part of the process concerns the production of ethanol from biomass and the separation of a fraction of water so as to obtain a 50–60% by weight ethanol concentration. The second part concerns the reactions of partial oxidation/reforming and shift of ethanol for the production of hydrogen and its separation form $CO_2$ if necessary. The third part concerns the production of electric energy using fuel cells.

The process of hydrogen and electrical energy production of the invention is presented diagrammatically in FIG. 1. The first part of the process concerns the production of ethanol via fermentation of sugars which are obtained directly from biomass or which are produced from cellulosic raw materials of biomass or from any type of suitable biomass which is a byproduct or waste product of industries involved in processing of agricultural or forestry products. The process of fermentation of sugars and production of ethanols is known and is applied industrially in large scale (C. E. Wyman, Handbook On Bioethanol, Taylor and Francis, 1996 and D. O. Hall, G. Grasi and H. Scheer, "Biomass for Energy and Industry", Proc. 7th Int. Conf. Biomass, Florence, Italy, Oct. 5–9, 1992). The ethanol which is produced by fermentation is contained in aqueous solution in concentrations of approximately 8–12%. The aqueous solution is then distilled so as to increase the ethanol content to the level of 50–60% by weight. The energy which is required for the distillation is obtained from the partial oxidation/reforming reactor (see FIG. 1). The process of distillation is also well known and is applied in large scale in chemical and petrochemical industries.

The aqueous solution which contains ethanol is subsequently fed to the partial oxidation/reforming reactor into which air is simultaneously fed with such a flow rate so that the quantities of ethanol and oxygen to be in stoichiometric proportion according to Reaction 2. Of course, the quantities of oxygen (air) which are fed to the reactor may be smaller or larger than the stoichiometric proportion, depending on the derived characteristics of the reaction, mainly the heat of reaction. For the reactions of partial oxidation/reforming of ethanol a suitable catalyst is required which must be sufficiently active and stable in time of use and especially selective for hydrogen production. Such a catalyst may contain metals of Group VIII of the Periodic Table or metals/metal oxides of the Transition Metals or combination of the above, either by themselves or supported on different carriers which are used for this purpose. A good catalyst for the partial oxidation/reforming of ethanol is a catalyst which contains Ni dispersed on a lanthanum oxide carrier, which is described in a Patent Application (Z. L. Zhang and X. E. Verykios, "A stable and active nickel catalyst for carbon dioxide reforming of methane to synthesis gas", European Patent Application 94600005.6-2104/13.07.94). Another good catalyst consists of metals of Group VIII of the Periodic Table dispersed on a carrier of titanium oxide doped with cations of Tungsten (W) (P. Papaefthimiou, Th. Ioannidis and X. Verykios, "Catalysts for the Combustion of Volatile Organic Compounds (VOC)", Greek Patent Application 970100021/24.1 1997).

High selectivity towards $CO_2$ in the reforming reaction is desirable since at least some types of fuel cells do not operate efficiently when the feed contains CO at concentration higher than 20–100 ppm, due to poisoning of the platinum electrode. Because the concentration of CO at the exit of the partial oxidation/reforming reactor will be higher than 100 ppm, processing of the gas in a shift reactor is required in which the following reaction is taking place:

$$CO + H_2O \leftrightarrows CO_2 + H_2, \Delta H = -10 \text{ Kcal/mol} \qquad (3)$$

The shift reaction is an equilibrium reaction and the conversion of CO increases with reduced temperature. This reaction has been studied by many researchers and there are various efficient catalysts for it (F. Gottschalk, Appl. Catal., 51 (1994) 127). If at the exit of the shift reactor the concentration of CO is higher than 100 ppm, this must be oxidized in the presence of a suitable catalyst, in another reactor in which a small quantity of oxygen or air is fed. Gold catalysts supported on selected carriers are active in the selective oxidation of CO in the presence of hydrogen at low temperatures (M. Haruta, Catal, Surveys of Japan, 1 (1997) 61). There is also the alternative solution of hydrogenation of CO towards $CH_4$, a reaction which is easily conducted over numerous catalysts.

The reaction of partial oxidation/reforming of ethanol can take place in any type of suitable reactor, as for example fixed bed reactor, fluidized bed reactor etc. For reactions of this type whose one part is exothermic (partial oxidation) and the other endothermic (reforming) we have developed a particularly efficient and safe reactor which consists of a bundle of ceramic or metallic tubes of small diameter which are encased in a vessel which is thermally insulated, as presented in FIG. 2. In the internal area of the tubes the partial oxidation catalyst is deposited while in the external area the reforming catalyst is deposited. The two catalysts may be the same or different. The heat which is produced by the oxidation of part of the fuel is transported through the wall in the external area of the tube, where the endothermic reforming reactions are taking place which consume the transported heat. In this way the reactor can operate adiabatically, the temperature distribution along the length of the reactor is controlled to a large extent, the operation of the reactor is safe since no hot zones are developed, the danger of explosion is eliminated, the pressure drop is small and the productivity of the reactor is high due to the optimization of the heat management of the reaction.

As is shown in FIG. 2, a large fraction of the length of the tubes does not contain catalysts. This part of the tubes is used as heat exchanger to heat the feed, which is introduced at low temperatures, from the reaction products which are at high temperature. In this manner the total volume of the process is minimized.

The shift reaction can take place in the same or different reactor. In the first case, in the external area of the tubes a catalyst for this reaction is deposited. Alternatively, catalysts in particle or pellet form can be placed in the volume external to the tubes if a larger area is required.

The length of the tubes which contains catalysts in the internal and external surface, the quantity of catalysts on each side, the type or types of catalysts, the total length of the tubes, the space at which the shift reaction is taking place, the diameter of the encasing vessel, and other similar parameters are defined in such a way so as to maximize the productivity of the reactor.

The reaction of partial oxidation/reforming of ethanol, with the stoichiometry described by Equation 2, is exothermic and for every mole of ethanol which reacts approximately 20 kcal of heat are produced. Of course, the exact quantity of heat which is produced can be controlled depending on the quantity of air or oxygen which is fed into the reactor. The heat of this reaction can be used not only for the preheating of the reactants (along with the heat of the products of the reaction) but also in the process of distillation of the aqueous solution of ethanol from the initial concentration of 8 to 12% to the desired concentration of 50 to 60%.

The hydrogen which is produced with the series of reactions which were described above i.e. the partial oxidation/reforming of ethanol, the shift reaction and, if necessary, the reaction of selective oxidation of CO, is fed to a fuel cell in which it is being oxidized electrochemically with oxygen with simultaneous production of electrical energy and heat. The most suitable fuel cells for the present application are those of the phosphoric acid type or the proton exchange membrane or solid polymers. The heat which is produced simultaneously with the electrical energy is generally of low quality because of the low temperatures (100–200° C.) and can be used for the heat of green-houses if the application is taking place in an agricultural area or buildings if the application is taking place near an urban center.

The process for production of hydrogen and electrical energy which is described above and is presented diagrammatically in FIG. 1 is a typical such process in which many alterations can take place, depending on specific situations or specific applications, without altering the present invention. The same is true for the catalysts and reactors of the partial oxidation/reforming of ethanol.

What is claimed is:

1. A process for producing hydrogen and electrical energy with no emission of pollutants from ethanol obtained from a biomass which comprises the steps of:
   (a) providing an aqueous solution of ethanol in a concentration of approximately 8 to 12% originating from fermentation of a biomass;
   (b) separating water from the aqueous solution of ethanol so that the aqueous solution of ethanol contains approximately 40 to 70% by weight ethanol;
   (c) mixing a portion of the aqueous solution of ethanol obtained according to step (b) with air or oxygen to form a mixture in such a way that the ratio of moles of oxygen per mole of ethanol is between 0.0 and 0.5;
   (d) separately feeding the aqueous ethanol obtained according to step (b) and the mixture containing aqueous ethanol and air or oxygen according to step (c) to a thermally insulated reactor comprising a thermally insulated casing and ceramic or metal tubes comprising a tube wall in the internal area of which and in the external area of which catalysts are placed which respectively catalyze reforming ethanol to obtain a gaseous mixture containing carbon dioxide and hydrogen and which catalyze oxidizing ethanol to obtain water, carbon dioxide, hydrogen with liberation of heat wherein each of the catalysts is the same or different;
   (e) adiabatically and separately reforming and partially oxidizing respectively the aqueous ethanol and the mixture containing aqueous ethanol and air or oxygen in the thermally insulated reactor wherein the heat of reaction needed to carry out the reforming of the aqueous ethanol is supplied by the partial oxidizing of the mixture containing aqueous ethanol and air or oxygen and is transported through the walls of the tubes within the thermally insulated reactor from the partial oxidation reaction to the reforming reaction to obtain the gaseous mixture containing carbon dioxide and hydrogen and to control temperature distribution along the length of the thermally insulated reactor;
   (f) following the reforming of the aqueous ethanol in step (e) to obtain the gaseous mixture containing carbon dioxide and hydrogen, either performing a water gas shift reaction to convert any carbon monoxide formed in the gaseous mixture during the reforming along with water vapor to hydrogen and carbon dioxide, or combusting the carbon monoxide, or converting the carbon monoxide to methane; and
   (g) separating the hydrogen from the gaseous mixture in the thermally insulated reactor, and feeding the hydrogen to a fuel cell for producing electrical energy.

2. The process for producing hydrogen defined in claim 1 wherein according to step (g) the hydrogen is fed as fuel to a fuel cell for the production of electrical energy and heat.

3. The process for producing hydrogen defined in claim 1 wherein according to step (g) the fuel cell is of the phosphoric acid type or proton exchange membrane or solid polymer.

4. The process for producing hydrogen defined in claim 1 wherein according to step (d) the catalyst is a Group VIII metal or a transition metal oxide, either supported on a carrier or not.

5. The process for producing hydrogen defined in claim 1 wherein according to step (b) the aqueous solution of ethanol contains 50 to 60% by weight ethanol.

* * * * *